United States Patent Office 3,542,734
Patented Nov. 24, 1970

3,542,734
POLYAMIDES CONTAINING THE DIVALENT
9,10-TRIPTYCENE RADICAL
Wallace Larimer Rippie, Louisville, Ky., assignor to E. I. du Pont de Nemours and Company, Wilmington, Del., a corporation of Delaware
No Drawing. Filed Mar. 17, 1967, Ser. No. 623,808
Int. Cl. C08g 20/00
U.S. Cl. 260—47
1 Claim

ABSTRACT OF THE DISCLOSURE

Fiber and film forming polyamides containing the divalent 9, 10-triptycene radical.

---

This invention relates to novel derivatives of triptycene and polymers thereof.

It is known that triptycene ($C_{20}H_{14}$) having the three-dimensional configuration

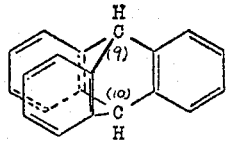

may be prepared by the benzyne or quinone addition to anthracene (Fieser and Fieser, "Organic Chemistry," Third Edition (1956), page 760).

My invention resides in the discovery of (1) novel triptycene derivatives of the formula $Tri(B)_2$ where Tr represents a divalent 9,10-triptycene radical and B represents a radical selected from the group consisting of $NH_2$, NHR (R is alkyl or phenyl), —NC=O, —$CO_2$— COR' (R' is alkyl), —COX (X is halogen), —$CO_2R''$ (R" is hydrogen, alkyl or phenyl), —$CH_2OH$, and —$CH_2OCOX$ (X is halogen) which may be prepared from appropriate 9,10-disubstituted anthracene; and (2) polymers derived therefrom having the recurring unit (—Tr—A—) wherein —Tr— represents a divalent 9,10-triptycene radical and A is selected from the group of radicals consisting of amide radicals

—NHC(=O)—R—C(=O)NH— and

—C(=O)NHR—NHC(=O)— wherein R is an alkylene radical having 2 to 12 carbon atoms, meta-phenylene, para-phenylene and

—$C_6H_4$—O—$C_6$[—$C_6H_4$—]

urethane radicals

—NHC(=O)—O—Tr—O—C(=O)—NH—
—NHC(=O)—O—$R_2$—O—C(=O)—NH— and

—$CH_2$—O—C(=O)—$NHR_1NHC$(=O)—O—$CH_2$— wherein Tr is defined as above and $R_1$ is an alkylene group having 2 to 12 carbon atoms, meta-phenylene, para-phenylene and tolylene radicals; ester radicals

—$CH_2$—O—C(=O)—$R_3$—C(=O)—O—$CH_2$— wherein $R_3$ is meta-phenylene, para-phenylene and

—$C_6H_4$—$R_4$—$C_6H_4$— wherein $R_4$ is methylene and isopropylidene radicals; carbonate radicals

—$CH_2$—O—C(=O)—O—C(=O)—O—$CH_2$— and

—$CH_2$—O—C(=O)—O—$R_5$
—O—C(=O)—O—$CH_2$— wherein $R_5$ is meta-phenylene, para-phenylene and

—$C_6H_4$—$R_6$—$C_6H_4$— wherein $R_6$ is methylene and isopropylidene radicals; and anhydride radicals of the formula

—C(=O)—O—C(=O)—

The following examples are illustrative of the preparation of representative species of novel triptycene monomeric derivatives within the scope of my invention.

EXAMPLE 1

(A) 9,10-bis(hydroxymethyl)triptycene—$Tri(CH_2OH)_2$

To 64.5 g. of 9,10-bis(acetoxymethyl)anthracene in 600 ml. of methylene chloride in a 3 liter, three-necked flask equipped with a Glascol mantle, an air stirrer, a condenser with a drying tube, a dropping funnel and a gas inlet, were added 41.2 ml. of freshly distilled isoamyl nitrite in 80 ml. of methylene chloride. The mixture was brought to reflux at approximately 40° C. with vigorous stirring under a nitrogen blanket. A solution of 35.6 g. of anthranilic acid in 125 ml. of tetrahydrofuran was decolorized and filtered before addition to the above mixture over a period of six hours. The reaction was heated for an additional 20 minutes and then cooled and allowed to stir overnight. The reaction was transferred to a single-necked, round bottom flask and the solvents were removed on a vacuum evaporator. To the reddish brown residue was added 250 ml. of diethylene glycol dimethyl ether and 20 g. of maleic anhydride. The solution was refluxed for one hour and poured into a solution of 100 g. of potassium hydroxide, 300 ml. of water and 600 ml. methanol. This solution was stirred and refluxed at approximately 80° C. for 30 minutes. It was then cooled in ice and filtered. The isolated solid was washed with water and dried. It was gray, weighed 17.6 g. and melted at 305–308° C.

The filtrate was diluted with water until no further product separated. The solids were again isolated and dried. They were light brown, weighed 35.9 g. and melted at 303–306° C.

The crude products were decolorized in ethanol and recrystallized from ethanol-water, yielding 45.4 g. (72%) of colorless solid melting at 310–311° C.

*Analysis.*—Calculated for $C_{22}H_{18}O_2$ (percent): C, 84.03; H, 5.77. Found (percent): C, 84.25; H, 6.10.

(B) A second method of preparation was carried out as follows:

To a solution of 13.7 g. (0.10 mole) of anthranilic acid and 0.15 g. of trichloroacetic acid in 150 ml. of tetrahydrofuran at 0° was added 25 ml. of redistilled amyl nitrite, slowly with stirring. A tan-orange precipitate separated and was allowed to warm to room temperature over 1 hour. The solid was collected on a polyethylene filter and washed with cold tetrahydrofuran until the washings were colorless. The solid was then washed quickly with cold methylene chloride and transferred to a refluxing suspension of 24.5 g. (0.0755 mole) of 9,10-bis(acetoxymethyl)anthracene using a polyethylene policeman and a stream of methylene chloride. The resulting suspension was refluxed for 2 hours, and the solvent was removed at reduced pressure, leaving a brown paste. This was dissolved in 100 ml. of diethylene glycol dimethyl ether, 8 g. of maleic anhydride was added, and the brown solution was refluxed for 1 hour. The mixture was then poured into a solution of 40 g. of potassium hydroxide in 120 ml. water/240 ml. methanol, and the suspension was boiled for 30 minutes with stirring. Water was added until crystallization was complete, and the product was filtered. The ivory solid was washed with water until the washings were neutral, and dried, affording 22.2 g. (0.0706 mole, 93.7%) of 9,10-bis(hydroxymethyl)triptycene, M.P. 310–311° C. The mother liquors yielded a second crop of tan solid which, after recrystallization, had M.P. 304–305° C., for a total yield of 22.8 g. (0.0726 mole, 96.2%).

EXAMPLE 2

9,10-bis(methylenechloroformyl) triptycene

In a three-necked flask equipped with a Dry Ice condenser connected to a calcium chloride tower, a gas inlet tube, a magnetic stirrer and a water bath, were condensed 200 ml. of phosgene at 0° C. The gas inlet tube was removed and replaced by a plug, and 400 ml. of chilled ethylene glycol dimethyl ether distilled from sodium was then added.

The solution was warmed to room temperature and 10 g. of 9,10-bis(hydroxymethyl)triptycene (Example 1) was added. The bath was warmed to 45° C., maintaining an inside temperature of 41° C., and the reaction was stirred for 6¼ hours. The reaction was then cooled to room temperature and stirred overnight. The following day, the reaction was again warmed to 41° C. and stirred for 7½ hours. After stirring again at room temperature overnight, the phosgene was removed at 50° C. and destroyed by passing it through an alcoholic potassium hydroxide solution. The glycol dimethyl ether was then removed on the vacuum evaporator leaving a colorless residue. The crude product was taken up in dry carbon tetrachloride. It was then allowed to crystallize. The crystalline product was removed by filtration, dried on a pump over phosphorus pentoxide at room temperature. It weighed 11.1 g. and melted at 266–267° C. Reduction of the volume of carbon tetrachloride solution yielded another gram of the product melting at 267–268° C.

*Analysis.*—Calculated for $C_{24}H_{16}O_4Cl_2$ (percent): C, 65.61; H, 3.67; Cl, 16.14. Found (percent): C, 65.50; H, 3.74; Cl, 15.79.

The infrared spectrum in, Nujol$_{max.}$ exhibited characteristic bands at 1760 cm.$^{-1}$ and in the 1900–1140 cm.$^{-1}$ region.

EXAMPLE 3

9,10-triptycenedicarboxylic acid—Tr(COOH)$_2$

A paste consisting of 4.46 g. of chromium trioxide and 4.0 ml. of conc. sulfuric acid was carefully diluted to a volume of 15 ml. with water and allowed to cool to room temperature. This solution was added to a stirred suspension of 5.0 g. of 9,10-bis(hydroxymethyl)triptycene (Example 1) in 190 ml. of acetone at a rate such that the temperature did not exceed 35° C. When the addition was completed the green mixture was stirred overnight at room temperature. The volume was reduced to one half on a solvent stripper and an equal volume of water added. The acetone was then stripped off completely. The powdered green suspension was filtered and washed with water to remove all coloration. The wet solids were then dissolved in 75 ml. of 10% aqueous potassium hydroxide, filtered and acidified with 10% aqueous hydrochloric acid. After digesting for 15 minutes on a steam bath the solids were filtered and dried in a vacuum oven at 100° C. for 4 hours to give 4.88 g., 90% yield of 9,10-triptycenedicarboxylic acid. An analytical sample was recrystallized from dioxane, Nujol$_{max.}$=1695, 1266 cm.$^{-1}$.

*Analysis.*—Calc. for $C_{22}H_{14}O_4$ (percent): C, 77.18; H, 4.12. Found (percent): C, 77.12; H, 4.60.

EXAMPLE 4

9,10-triptycenedicarboxylic acid, anhydride with acetic acid—

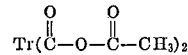

A solution of 5.0 g. of 9,10-triptycenedicarboxylic acid (Example 3) in 50 ml. of acetic anhydride was distilled off under slightly reduced pressure until the solids began to precipitate. After allowing this mixture to cool to room temperature the solids were collected and dried in a vacuum oven at 50° C. for 1 hour to give 3.95 g., 64% yield, of the mixed anhydride; M.P. 169–170° C., Nujol$_{max.}$=1801, 1739, 1161, 1084 cm.$^{-1}$.

EXAMPLE 5

9,10-triptycenedicarbonyl chloride—

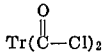

A solution of 5.7 g. of 9,10-triptycenedicarboxylic acid (Example 3) in 110 ml. of dioxane was added dropwise over a period of 3 hours to 40 ml. of purified thionyl chloride at reflux. This yellow solution was refluxed with stirring for an additional 6 hours and left to cool to room temperature overnight. The solvents were removed on a solvent stripper and the solids recrystallized from carbon tetrachloride to give 3 crops with a total weight of 5.68 g., 90% yield, of acid chloride. An analytical sample was obtained by recrystallization from carbon tetrachloride; M.P. 315–316° C., Nujol$_{max.}$=1785, 1058, 1042 cm.$^{-1}$ NMR signals at 487 (multiplet) and 543 (multiplet) c.p.s.

*Analysis.*—Calc. for $C_{22}H_{12}O_2Cl_2$ (percent): C, 69.67; H, 3.19; Cl, 18.70. Found (percent): C, 69.69; H, 3.11; Cl, 18.86.

EXAMPLE 6

9,10-triptycenedicarboxylic acid, dimethyl ester—

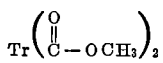

A suspension of 3.30 g. of 9,10-triptycenedicarbonyl chloride (Example 5) was refluxed in 50 ml. of methanol for 2 hours. During the reflux period the solution began to bump slightly and the solids developed a different texture. The mixture was cooled and filtered to give 3.3 g., 96% yield, of dimethyl ester. These solids were dissolved in chloroform and filtered through alumina before evaporating to dryness. Recrystallization from dioxane gave the dimethyl ester; M.P. 260–262° C., Nujol$_{max.}$=1719, 1252, 1019 cm.$^{-1}$ NMR signals at 270 (singlet), 450 (multiplet), and 494 (multiplet) c.p.s.

EXAMPLE 7

9,10-triptycenedicarboxylic acid, diphenyl ester—

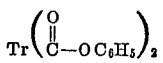

A mixture of 4.95 g. (53.0 m.moles) of phenol and 1.00 g. (25.0 m.moles) of sodium hydroxide were dissolved in dioxane and the dioxane evaporated to dryness under vacuum on a solvent stripper to give a powdery solid. To this solid was added 2.0 g. (5.3 m.moles) of 9,10-triptycenedicarbonyl chloride (Example 5) and 50 ml. of dry dioxane. The suspension was refluxed for 4 hours and allowed to cool to room temperature overnight. The suspension was poured into 400 ml. of water and treated with 20% hydrochloric acid until just acid. The precipitate was stirred for 15 minutes and filtered, then dried to give 2.15 g., 94% yield, of diphenyl ester. The solids were taken up in chloroform and filtered through alumina before evaporating to dryness. The analytical sample was recrystallized from dioxane, M.P. 303–304° C., Nujol$_{max.}$=1744, 1236, 1181, 1123 cm.$^{-1}$

*Analysis.*—Calc. for $C_{24}H_{22}O_4$ (percent): C, 82.57; H, 4.49. Found (percent): C, 82.59; H, 4.47.

EXAMPLE 8

9,10-triptycenedicarbonylhydrazide—

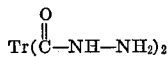

A suspension of 1.00 g. of 9,10-triptycenedicarboxylic acid, dimethyl ester (Example 6) in 50 ml. of methanol was refluxed with 40 ml. of 64% hydrazine for 8 hours, when the system became homogeneous, it was heated further for 2 hours. The excess solvent was distilled off and the solids collected and dried to give 0.250 g., 25% yield, of dihydrazide, M.P. >350° C., Nujol$_{max.}$=3468, 3193, 1662, 1618, 1044, 968 cm.$^{-1}$

EXAMPLE 9

(A) 9,10-triptycene diisocyanate—Tr(NCO)$_2$

To a stirred suspension of 4.8 g. (1.25×10$^{-2}$ mole) of 9,10-triptycenedicarbonyl chloride (Example 5) was added 2.01 g. (3.1×10$^{-2}$ mole) of sodium azide, and the mixture was stirred in a dry box for 16 hours. The reaction mixture was poured into 500 ml. of water, with stirring, and the 5.21 g. of white precipitate was filtered and dried in a vacuum desiccator under aspirator pressure. Caution: The crude 9,10-triptycenedicarbonyl azide is explosive and should not be heated or subjected to low pressure evacuation in the solid state. Recrystallization from 30 ml. DMF (dimethylformamide)/150 ml. water afforded 4.33 g. of white solid, whose infrared spectrum showed characteristic azid absorption at 2130 cm.$^{-1}$ (4.7$\mu$). This was suspended in 50 ml. of dry xylene and refluxed, under N$_2$, for 16 hours. Repeated concentration of the xylene mixture and treatment with low boiling petroleum ether gave three successive fractions of crude product containing 9,10-triptycene diisocyanate and 9,10-triptycene dicarboxylic acid, the latter fractions being enriched in the desired diisocyanate. Each fraction was sublimed separately at 0.5–1.5 mm., and 170–230° C., and the sublimates were combined and resublimed to yield 1.81 g. (5.38×10$^{-3}$ mole, 43%, based on diacyl dichloride) of 9,10-triptycene diisocyanate, M.P. 171–172° C. The infrared spectrum was characterized by major bands at cm.$^{-1}$ ($\mu$): 3070 (3.26), 2270 (4.40), 1190 (8.40), 1003 (9.96), 890 (1.12), 758–745 (13.2–13.4) broad.

*Analysis.*—Calc. for $C_{22}H_{12}N_2O_2$ (percent): C, 78.56; H, 3.60; N, 8.33. Found (percent): C, 78.63; H, 3.54; N, 8.47.

(B) An alternative method of preparation is as follows:

A solution of 1.0 g. (2.55×10$^{-3}$ mole) of 9,10-triptycenedicarbonyl azide and 0.5 ml. of acetophenone in 75 ml. of dry benzene was placed in a quart cylindrical cell of 100 ml. capacity, equipped with a condenser, drying tube, magnetic stirrer, and nitrogen sparger. The cell was fastened in a Srinivasan-Griffin photochemical reactor chamber, equipped with a low pressure mercury lamp, emitting principally light of 2537 A. The solution was sparged with nitrogen for 15 minutes and was then photolyzed at 35° C. under nitrogen for 1 hour. The solution had become pale brown. The total volume of photolyzate was reduced to 20 ml. and was passed through a 2 x 2 cm. column of florisil, using 150 ml. of benzene as eluent. The solvent was evaporated, leaving 0.8 g. of oily solid. This was sublimed at 0.4 mm. and 150–170° C. to give 0.335 g. (10$^{-3}$ mole, 39.2%) of 9,10-triptycene diisocyanate, M.P. 170–173° C., whose infrared spectrum matches that of an analytical sample. In a second run carried out exactly as described above but without the addition of the acetophenone as a photosensitizer a yield of 33% was achieved.

EXAMPLE 10

9,10-triptycene diamine—Tr(NH$_2$)$_2$

A 2.11 g. (5.8×10$^{-3}$ mole) sample of 9,10-triptycene diisocyanate (Example 9) was suspended in 30 ml. of 5% potassium hydroxide solution. Ethanol (10 ml.) was added to this, and the mixture was refluxed for 8 hours. The reaction mixture was colorless and contained suspended white solid. Addition of 25 ml. of water, filtration, and washing with 10 ml. of water afforded 1.79 g. of ivory colored solid. This was sublimed twice at 0.6 mm. and 220° C. to give 1.37 g. (4.81×10$^{-3}$ mole, 83%) of 9,10-triptycenediamine. An analytical sample had M.P. 290–292° C. The infrared spectrum was characterized by major bands at cm.$^{-1}$: 3350, 1590 (broad), 1300, 928 (broad) 890, 798 (broad), and 752 (broad).

The foregoing derivatives being bifunctional are useful as intermediates in the preparation of a variety of polymers. Thus 9,10-triptycene diamine and 9,10-triptycenedicarbonyl chloride may be employed as amide-forming reactants in the known preparation of linear polyamides. Similarly, the dihydroxy- and diisocyanate-substituted triptycenes serve as polyurethane-forming reactants; and 9,10-dihydroxy substituted triptycenes may be converted to polyesters by reaction with other suitable ester-forming reactants, as to polycarbonates by reaction with diphenyl carbonate, chloroformate, etc., under conditions generally known to the art.

The following examples are illustrative of the derivation of representative polymers from the intermediates above described.

Examples 11–14 disclose the preparation of polyamides.

EXAMPLE 11

To a stirred 2-phase mixture of a solution of 0.178 g. (6.25×10$^{-4}$ mole) of 9,10-triptycenediamine (Example 10) in 8 ml. of methylene chloride and 0.09 g. of NaOH in 30 ml. of water was added dropwise 0.160 g. (6.70×10$^{-4}$ mole) of redistilled sebacyl chloride, and the mixture was stirred for 20 minutes, during which time a cream-colored amorphous solid separated. The solution was heated for 20 minutes to expel methylene chloride, and the precipitate was filtered and washed with water. The infrared spectrum of the solid product (0.175 g.) showed a small residue of acid chloride, as evidenced by a weak carbonyl peak at 1800 cm.$^{-1}$ (5.55/$\mu$). Clarification and recrystallization from 7 ml. DMF/15 ml. water yielded 0.105 (37%) of ivory colored polyamide (consisting of recurring units of the formula

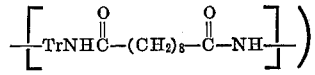

which began gradual softening at 140°; inherent viscosity in dimethylacetamide =0.08. The infrared spectrum exhibited characteristic bands at 3350 cm.$^{-1}$ (2.98$\mu$), 1670 cm.$^{-1}$ (5.98$\mu$), and 1510 cm.$^{-1}$ (6.62$\mu$).

EXAMPLE 12

The polymerization to produce polyamides having recurring units of the formula

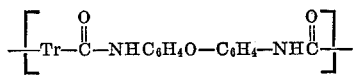

was carried out in a range of solvents including chloroform, nitrobenzene, ethyl acetate, dioxane, dimethyl acetamide, tetrachloroethane, and an ethyl acetate-chloroform mixed solvent. The following general procedure led to inherent viscosities ranging from $\eta$=0.22 to $\eta$=1.61, corresponding to molecular weights up to about 35,000. When aluminum chloride catalysis was used in chloroform solvent an inherent viscosity of $\eta$=0.53 was obtained.

A suspension of 1.3224 g. (6.596 moles of powdered oxydianiline in 25 ml. of ethyl acetate is stirred at room temperature with 1.90 ml. (13.70 mmoles) of freshly distilled triethylamine. To this was added 2.500 g. (6.596 mmoles) of 9,10-triptycenedicarbonyl chloride along with 50 ml. of solvent over a period of 3 hours. This mixture was allowed to react for 1½ days before pouring into 500 ml. of methonal. The methanolic suspension was stirred for 2 hours, filtered, and dried to give 3.31 g., 98% yield, of polymer $\eta = 1.11$. The infrared showed absorption at $\text{Nujol}_{max}. = 1685$, 1492, 1217 cm.$^{-1}$. Films cast from ethyl acetate-chloroform ($\eta = 0.93$) had a modulus of 384,000 p.s.i. tenacity of 9,400 p.s.i. and elongating of 4.2%. These films constitute effective separation membranes for separating hydrogen and helium from methane gas.

EXAMPLE 13

A solution of 2.5 g. (6.6 m.moles) of 9,10-triptycenedicarbonyl chloride in 50 ml. of chloroform was placed in a 250 ml. beaker and a solution of 1.92 g. (16.5 m.moles) of 9,10-triptycenedicarbonyl chloride along carefully poured on top. Polymerization occurred at the interface, but no rope or fiber could be pulled. Instead a crumbly solid was obtained. The mixture was rapidly stirred for 15 minutes to complete polymerization. Methanol was added to disperse the emulsion and the solids were filtered off, washed with 2× 100 ml. with methanol for 1 hour and dried to give 2.60 g., 76% yield, of polymer with an inherent viscosity of 1.13. Polymer cast from a dimethylsulfoxide organosol at 160° C. yielded a clear brittle film. The polyamide is characterized by recurring groups of the formula

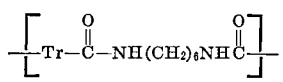

EXAMPLE 14

A suspension of 0.7133 g. (6.596 m.moles) of m-phenylenediamine and 1.90 ml. of triethylamine in 50 ml. of 1:1 ethyl acetate-chloroform was stirred at room temperature. 9,10-triptycenedicarbonyl chloride was added as a solid in 3 batches with the addition of some rinse solvent. Total acid chloride was 2.5000 g. (6.596 m.moles) in a total volume of 50 ml. of solvent. The suspension was stirred for 1½ days and poured into 500 ml. of methanol. The solids were stirred in methanol for 2 hours, filtered, and dried in a vacuum oven at 100° C. to give 3.75 g. of polymer. The infrared showed absorption at $\text{Nujol}_{max}. = 3422$, 1698, 1600, 1519 cm.$^{-1}$. The polyamide is characterized by recurring units of the formula

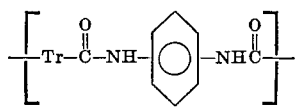

Examples 15–19 disclose the preparation of polyurethanes.

EXAMPLE 15

A suspension of 1.518 g. (5×10$^{-3}$ mole) of 9,10-bis-(hydroxymethyl)triptycene and 1.682 g. (5×10$^{-3}$) of 9,10-triptycene diisocyanate in 20 ml. of redistilled tetrachloroethane was purged well with N$_2$ and heated to reflux. The resulting clear solution was refluxed, under N$_2$, for 91 hours; the mixture became dark brown within 24 hours. Treatment with 500 ml. methanol/250 ml. water gave 3.02 g. of cream-colored solid. Recrystallization from acetone/water afforded 2.72 (88%) of tan solid which foamed at 200–311° and liquefied at 311°; inherent viscosity in DMAC (dimethylacetamide)—0.085. The infrared spectrum showed characteristic urethane carbonyl stretching at 1720 cm.$^{-1}$ (5.8μ) and revealed isocyanate end groups from a small peak at 2270 cm.$^{-1}$ (4.4μ). A thin film was cast from acetone solution. Polymer recurring groups are of the formula

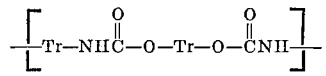

EXAMPLE 16

A suspension of 0.233 ml. (4.98×10$^{-3}$ mole) of redistilled ethylene glycol and 1.676 (4.98×10$^{-3}$ mole) of 9,10-triptycene diisocyanate was heated, under N$_2$, at 100° for 117 hours. The resulting clear solution was completely miscible with methanol, and precipitation was effected by the addition of 125 ml. methanol/600 ml. water. The tacky polymer which separated (having recurring groups of the formula

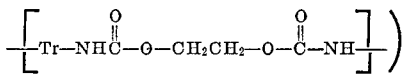

hardened within 24 hours to yield 1.84 g. of white solid, which began to soften at 160°, inherent viscosity in DMAC—0.04. The infrared spectrum exhibited urethane carbonyl stretching at 1720 cm.$^{-1}$ (5.8μ) and widened isocyanate end groups from a peak of medium intensity at 2270 cm.$^{-1}$ (4.4μ). A thin, clear film was cast from tetrachloroethane solutions.

EXAMPLE 17

In a 100 ml., three-necked flask equipped with condenser and drying tube, nitrogen bubbler, Glascol mantel and magnetic stirrer were charged 40 ml. of dry tetrachloroethane, 1.0814 g. of m-phenylenediamine and 4.393 g. of 9,19-bis(methylenechloroformyl)triptycene. The reaction mixture was heated to the boiling point with stirring for 6 hours. The polymer precipitated from this solution with methanol and an inherent viscosity of 0.47 in tetrachloroethane at 30° C. A self-supporting film was cast from the polymerization mixture. The polymer fused at about 320° C. Recurring groups are of the formula

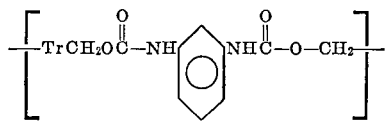

EXAMPLE 18

In a flame dried, magnetically stirred, 100 ml. three-necked flask equipped with condenser, drying tube and nitrogen inlet were charged 3.1436 g. of 9,10-bis(hydroxymethyl)triptycene, 35 ml. of dioxane (distilled from sodium), and 2.5026 g. of vacuum distilled methylene bis (p-phenyl isocyanate). The diisocyanate was washed in with 5 ml. of dioxane. The mixture was heated to reflux and 0.01 ml. of a 15% butyl lithium solution in hexane was injected. The viscous solution was cooled after 20 minutes. The polymer was precipitated and washed with methanol in a blender and dried at 100° C. under vacuum. The colorless product had an inherent viscosity of 0.59 in tetrachloroethane at 30° C. Self-supporting film was cast from a tetrahydrofurane solution. The infrared spectrum of the film was typical of polyurethane, NH absorption at 3300 cm.$^{-1}$ and carbonyl at 1730 cm.$^{-1}$ microns.

EXAMPLE 19

Into an apparatus similar to that described in Example 18 there were charged 3.1436 grams of 9,10-bis(hydroxymethyl)triptycene, 35 ml. of dioxane (distilled from sodium), and 2.5026 grams of vacuum distilled, 2,4-tolylene diisocyanate, washed into the flask with 5 ml. of dioxane. The mixture was heated to reflux, 0.01 ml. of a 15% butyl lithium in hexane was injected and the mixture was further heated at reflux for 1 hour and was then cooled. The polymer was precipitated and washed with methanol in a blender and dried at 100° C. under vacuum. The product had an inherent viscosity of 0.42 in tetrachloroethane at 30° C. In a second preparation following the procedure described above but using a 1,3-phenylene diisocyanate in place of the 2,4-tolylene diisocyanate a product was obtained having an inherent viscosity of 0.20.

Examples 20 and 21 disclose the preparation of polyesters.

EXAMPLE 20

A 100 ml. round bottom flask equipped with a magnetic stirrer was placed in a nitrogen dry box and charged with 30 ml. of purified nitrobenzene and 10 ml. of pyridine dried over barium oxide. To these solvents were added 3.142 g. of 9,10-bis(hydroxymethyl)triptycene and 2.030 g. of redistilled isophthalyl chloride. The solution was stirred at room temperature overnight. A precipitate appeared soon after mixing. The mixture was subsequently heated to reflux approximately 48 hours and then precipitated with alcohol. The solid polymer had an inherent viscosity of 0.13 in nitrobenzene at 30° C., and is characterized by recurring groups of the formula

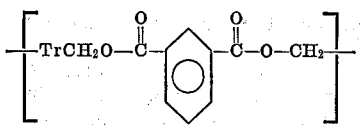

EXAMPLE 21

Into a polymer tube equipped with a side arm were charged with 3.1436 g. of 9,10-bis(hydroxymethyl)triptycene 3.1831 of diphenyl isophthalate and 0.011 g. of zinc acetate. Benzene was used to wash the reagents down into the tube and was later removed by pumping. The tube was deaerated by alternating flushing with nitrogen and evacuating. Both openings were then sealed and the tube was heated to 280° C. in a vapor bath. Phenol condensed in the side arm and was returned twice in the first half hour of heating. During the subsequent 45 minutes of heating, the tube was tipped in such a way that the phenol was allowed to drain back into the tube. During the next half hour of heating, the tube was tipped every few minutes collecting phenol in between tippings. The following half hour, the tube was tipped only twice to drain phenol back. During the last one hour and forty-five minutes, phenol was collected. During the next hour of heating, the polymer foamed up and became so viscous that it did not flow back to the bottom of the tube. A sample of this polymer had an inherent viscosity of 0.07 in nitrobenzene at 30° C. and a polymer melt temperature of 275° C. The polymer was now transferred to a small stirred vessel and was heated to 330–40° C. at 0.75 mm. for two hours. A sample was taken, found to have a viscosity of 0.26, and a polymer melt temperature of 370° C. The apparatus walls were cleaned of condensate which contained both carbonyl and hydroxy groups. The polymer was returned to the apparatus and reheated to 330–340° C. at 0.3–0.75 mm. for 2 more hours. The melt could not be well stirred throughout this last cycle because it became highly viscous. The inherent viscosity of the final polymer was 0.51. Similar polymerizations carried out with diphenyl terephthalate gave polymers with inherent viscosity around 0.1. A similar polymerization with the diphenyl ester of propane - 2,2 - bis(p-benzoic acid) gave inherent viscosity of 0.26.

Examples 22 to 25 disclose the preparation of polycarbonates.

EXAMPLE 22

A polymer tube with a side arm was charged with 3.1436 g. 9,10-bis(hydroxymethyl)triptycene, 2.1421 g. diphenyl carbonate (Chemtron) and 0.001 g. zinc acetate as in Example 21. The sealed tube was immersed in a 280° C. vapor bath at such an angle that the phenol evolved could not collect in the side arm but ran back into the reaction zone. After one hour the tube was brought to the vertical position where phenol would collect in the side arm. The polymer foamed up onto the walls but was heated another hour while phenol was collected. It was then cooled and the polymer ground and transferred to a stirred reactor where it was heated at 300° (±1) for 2 hours and 40 minutes at 0.45 mm., then at 340° C. for one hour at 0.3 mm. During the final heating the polymer was only partially melted. Its final stick temperature was 385° C. and its inherent viscosity in nitrobenzene at 30° C. was 0.28.

EXAMPLE 23

In apparatus similar to that described in Example 17 were charged 1.1011 g. of hydroquinone (Baker purified), 4.393 g. of 9,10-bis(methylenechloroformyl) triptycene, and 40 ml. dry, redistilled nitrobenzene. The solution was heated to 140–150° C. for approximately 54 hours. A gray solid polymer was precipitated with methanol. The inherent viscosity of the polymer in tetrachloroethane at 30° C. was 0.06. The infrared spectrum was typical of a polycarbonate.

EXAMPLE 24

In a 100 ml. resin kettle equipped with a thermometer, nitrogen bubbler, condenser, with drying tube and air driven stirrer as well as Glascol mantle were charged 30 ml. of dry, redistilled nitrobenzene, 3.1436 g. of 9,10-bis(hydroxymethyl)triptycene and 2.3503 g. of phenylene-1,4-bis(chloroformate). The solution was stirred and heated for 3 days between 160–170° C. It was then precipitated with methanol giving a polymer which had an inherent viscosity of 0.07 in tetrachloroethane at 30° C. The infrared spectrum was essentially identical to the polycarbonate prepared from triptycene-9,10-bis(methylene chloroformate) and hydroquione.

EXAMPLE 25

9,10-bis(methylenechloroformyl)triptycene and 2,2-bis-(p-hydroxyphenyl)propane by interfacial polymerization A solution was prepared of 43 ml. of water, 1.64 g. of recrystallized 2,2-bis(p-hydroxyphenyl)propane and 0.58 g. sodium hydroxide in a blender at slow speed. A solution of 9,10 - bis(methylenechloroformyl)triptycene was prepared by dissolving the material in 22 ml. of dry tetrachloroethane. 4.3 ml. of a 1% lauryl sulfate solution in water was added to the phenol solution in the blender and mixed at maximum speed. The solution of bis (chloroformate) was now added rapidly and stirred an additional 5 minutes. The mixture was then added to methanol. The solid was collected and washed with methanol and water until soap-free. The isolated polymer had an inherent viscosity of 0.07 in tetrachloroethane at 30° C.

EXAMPLE 26

A poly(9,10-triptycene anhydride) having recurring groups of the formula

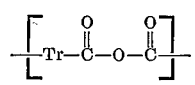

was prepared as follows:

A sample of 9,10-triptycenedicarboxylic acid anhydride with acetic acid was powdered and placed in a polymerization tube, then heated at 190° C. in ethylene glycol vapor at a pressure of 100 mm. The mixed anhydride melted and bubbled for about 15 seconds before solids began to form. As the acetic anhydride distilled off, the mass became solid. Heating was continued at a pressure of 1.0 mm. for 1 hour. The polymer was cooled and chipped from the tube. The infrared showed absorption at $$\text{Nujol}_{\text{max.}} = 1800, 1739, 1062, 960 \text{ cm.}^{-1}$$

The polymer was insoluble in all non-protonic solvents preventing the determination of solution properties. When treated with protonic solvents, i.e., aniline or methanol, polymer hydrolysis yields monomeric derivatives.

The molecular weight was determined by aniline hydrolysis of the polymer and neutralization equivalents from the resulting solutions are as follows:

Samples weighing 0.5 g. were hydrolyzed in 6-8 ml. of aniline and then diluted with 30 ml. of alcohol before titration with 0.1 N. potassium hydroxide. The average of 11 units indicates a molecular weight of 3400.

HYDROLYSIS OF POLY(9,10-TRIPTYCENE ANHYDRIDE)

| Time | [1] 4 | [2] 2.5 | [2] 5 |
|---|---|---|---|
| Found, meq./g | 3.98 | 3.86 | 3.76 |
| Calculated, meq./g | 3.27 | 3.27 | 3.27 |
| End groups, meq./g | 0.71 | 0.59 | 0.49 |
| Units | 9 | 11 | 13 |

[1] Hours. [2] Days.

Additional 9,10-triptycene polymers include a dibenzimidazole made from the reaction of 9,10-triptycenedicarboxylic acid, dimethyl ester and 3,3'-diaminobenzidine; a hydrazide prepared from 9,10-triptycenedicarbonyl chloride with hydrazine; a hydrazide from the said triptycene derivative reacted with terephthalic and a 1,3,4-oxadiazole by heating under vacuo a portion of poly(terepthaloxy-9,10-triptycene-hydrazide.

What is claimed is:
1. A fiber- and film-forming polyamide consisting essentially of the recurring group:

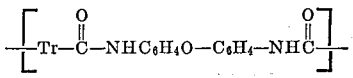

wherein —Tr— represents the divalent 9,10-triptycene radical.

References Cited

UNITED STATES PATENTS

| 3,094,511 | 6/1963 | Hill et al. | 260—78 |
| 3,287,321 | 11/1966 | Temin | 260—78 |
| 3,301,827 | 1/1967 | Martin | 260—78 |

HAROLD D. ANDERSON, Primary Examiner

U.S. Cl. X.R.

55—68; 260—30.4, 30.8, 31.2, 32.4, 32.6, 32.8, 33.4, 33.8, 75, 77.5, 78, 78.4, 453, 463, 475, 515, 544, 558, 570, 618

PO-1050
(5/69)

UNITED STATES PATENT OFFICE
CERTIFICATE OF CORRECTION

Patent No. 3,542,734        Dated November 24, 1970

Inventor(s) Wallace Larimer Rippie

It is certified that error appears in the above-identified patent and that said Letters Patent are hereby corrected as shown below:

Column 1, line 34, "Tri(B)$_2$" should read -- Tr(B)$_2$ --.

Column 2. line 17, "Tri(CH$_2$OH)$_2$" should read -- Tr(CH$_2$OH

Column 7, line 19, "9,10-triptycenedicarbonyl chloride along" should read -- hexamethylenediamine in 25 ml. of water was --.

Column 8, line 32, "9,19-bis..." should read -- 9,10-bis

Column 9, line 30, "0.011" should read -- 0.001 --.

Column 9, line 49, "330-40°C." should read -- 330-340°C.

Column 10, line 4, "(±1)" should read -- (±10) --.

Column 11, line 20, -- dihydrazide -- should follow "terephthalic".

Column 11, line 22, "epthaloxy-" should read -- ephthaloyl --.

SIGNED AND
SEALED
MAR 9 1971

(SEAL)
Attest:

Edward M. Fletcher, Jr.
Attesting Officer

WILLIAM E. SCHUYLER, J
Commissioner of Patent